Patented Oct. 31, 1950

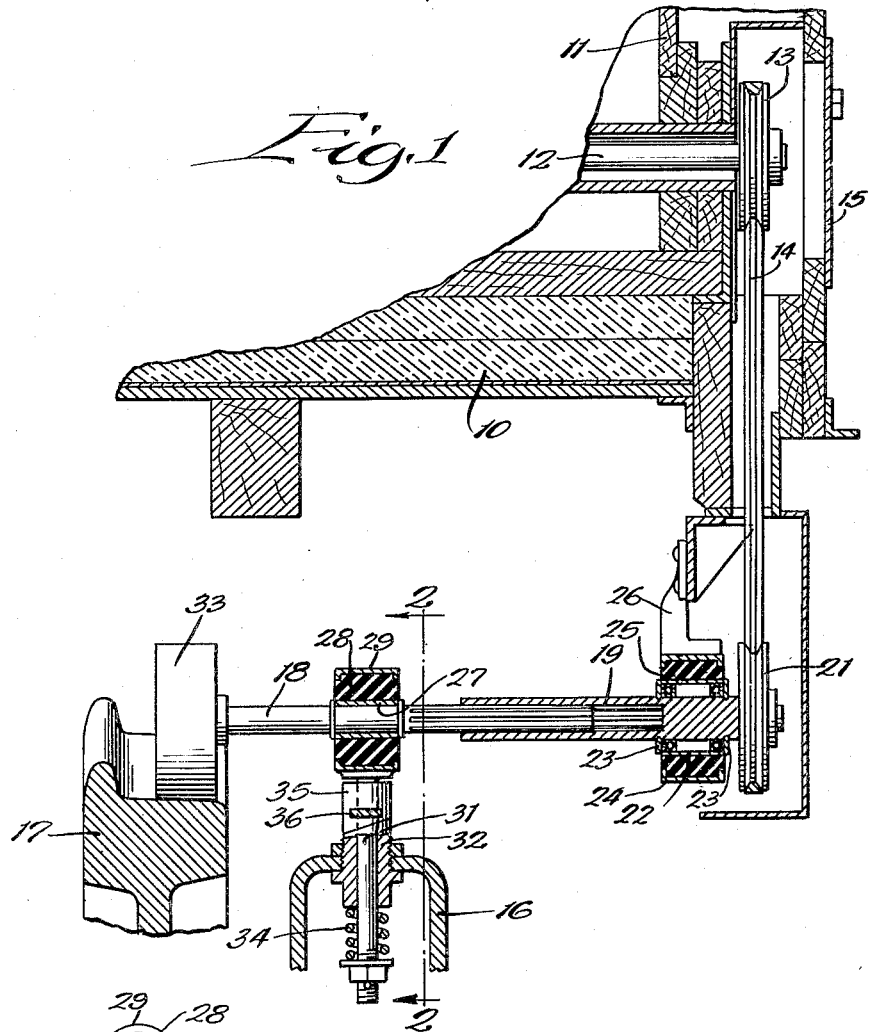
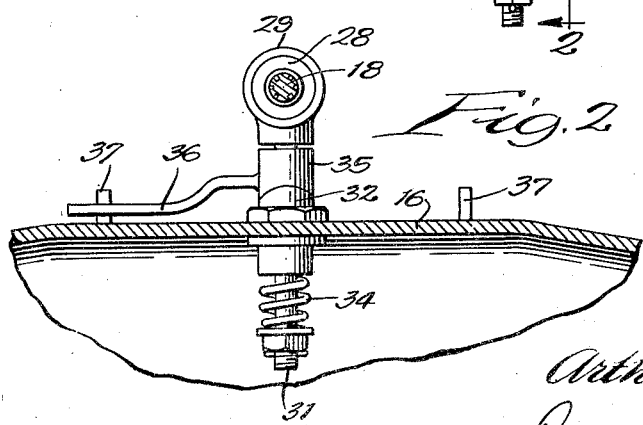

2,528,285

UNITED STATES PATENT OFFICE 2,528,285

POWER TAKE-OFF

Arthur F. O'Connor, Chicago, Ill., assignor to Union Asbestos & Rubber Company, a corporation of Illinois Application October 24, 1945, Serial No. 624,139

4 Claims. (Cl. 105—112)

This invention relates to power take-offs of the type used on railway refrigerator cars and the like, to drive fans, compressors or other auxiliary mechanism.

One of the objects of the invention is to provide a power take-off which is simple and inexpensive to manufacture and to install on a car.

Another object is to provide a power take-off in which the take-off drive roller is maintained in engagement with the car wheel under all conditions of operation. According to one feature of the invention the roller is so supported that it will follow the wheel in both its lateral and vertical movements relative to the car body.

Still another object is to provide a take-off which can be disconnected at will by moving the roller away from the wheel.

The above and other objects and advantages of the invention will be more readily apparent from the following description when read in connection with the accompanying drawing, in which—

Figure 1 is a partial sectional view through a car to which the invention is applied, and Figure 2 is a partial section on the line 2—2 of Figure 1.

The invention is illustrated in connection with a conventional refrigerator car having a car body including a floor 10 and a side wall 11. The car body may contain an auxiliary mechanism, not shown, driven by a shaft 12 projecting through the side of the car body and carrying a pulley 13. A belt 14 engages the pulley and may be enclosed by a cover plate 15 overlying the side of the car body.

The car body is pivotally supported on a conventional four-wheel truck, a portion of whose side frame is illustrated at 16. The truck carries rail-engaging wheels, one of which is shown at 17. In operation of the car around curves, the wheel 17 will turn about the pivotal connection between the truck and car body so that it moves laterally relative to the car body. In addition, the car body is supported on springs on the truck for slight vertical movement relative thereto.

The take-off mechanism, as shown, comprises a shaft section 18 having a non-circular end fitting telescopically into a hollow complementary shaft section 19. With this construction, the two shaft sections are connected for rotation together but can move lengthwise relative to each other. The shaft section 19 carries a pulley 21 over which the belt 14 fits to drive the pulley 13 and the shaft 12.

The shaft section 19 is mounted on the car body for universal pivotal movement relative thereto. As shown, the shaft section 19 is journaled in a supporting sleeve 22, which is held against lengthwise movement on the shaft by collars 23. The sleeve 22 is connected to an outer supporting ring 24 by an annular body of rubber 25 which is bonded to the sleeve and the ring. The ring 24 is carried by a bracket 26 bolted or riveted to the car body.

The shaft section 18 is similarly journaled in a supporting sleeve 27 which is connected through an annular body of rubber 28 to a ring 29. The ring 29 rigidly carries a pivot rod 31 extending slidably and rotatably through a bushing 32 which is secured to the truck frame 16. The shaft section 18 carries a take-off roller 33 in a position to engage the wheel 17 to be driven thereby. To maintain the roller in engagement with the wheel during vertical movement of the car body relative to the truck, a spring 34 acts on the pivot rod 31 and the bushing 32 to urge the pivot rod downward. During vertical springing movement of the car body, the spring 34 will yield to hold the roller 33 in engagement with the wheel at all times.

In operation around curves as the wheel 17 moves laterally of the car body, the shaft sections will telescope together or apart, so that the roller 33 will be maintained in engagement with the wheel. The rubber bodies 25 and 28 will yield during such movement to permit the necessary slight pivotal movement of the shaft sections. Since the pulley 21 is supported closely adjacent the mounting for the shaft section 19, its movement will be so slight as not to interfere with proper engagement of the driving belt with it.

In order to disengage the roller 33 from the wheel when it is desired that the auxiliary mechanism shall not be operated or when it is to be driven by an auxiliary drive motor when the car is stationary, a cam collar 35 is provided around the pivot rod 31. The collar 35 is cut at an angle at its lower end to cooperate with the upper end of the bushing 32 which is cut at a similar angle. The collar 35 may be turned by an arm 36 rigidly secured thereto and held in one or the other of its extreme positions by stops 37 on the truck frame.

When the collar is turned to the position shown, it moves toward the truck, permitting the spring 34 to move the roller into engagement with the wheel. When the collar is turned 180° the high side of its cammed surface engages the high side of the cam surface on the bushing 32 to elevate the shaft section 18 and move the roller away from the wheel. The rise of the cams on the collar and the bushing may be made sufficient to insure disengagement of the roller from the wheel when the collar is turned.

While one embodiment of the invention has been shown and described in detail, it will be understood that it is illustrative only and is not intended to be a definition of the scope of the invention, reference being had for this purpose to the appended claims.

What is claimed is:

1. A power take-off for a railway car having a car body pivotally supported on a truck carrying wheels which comprises a pair of supports, shaft sections carried by the supports and connected for relative lengthwise movement, mounting members on the car body and truck for the supports, a joint element on one of the supports cooperating with the mounting member on the car body to provide a universal pivotal connection, a pivot rod on the other support extending slidably and rotatably through the mounting member on the truck, a roller on the shaft section which is supported on the truck drivably to engage the wheel, a spring urging the pivot rod in a direction to press the roller against the wheel, and a rotatable cam collar encircling the pivot rod to move it against the spring thereby to move the roller away from the wheel.

2. A power take-off for a railway car having a car body pivotally supported on a truck carrying wheels which comprises a pair of supports, shaft sections carried by the supports and connected for relative lengthwise movement, mounting members on the car body and truck for the supports, a joint element on one of the supports cooperating with the mounting member on the car body to provide a universal pivotal connection, a pivot rod slidably and rotatably fitting into the mounting member on the truck, means connecting the pivot rod to the other support for universal pivotal movement, and a spring urging the pivot rod in a direction to press the roller against the wheel.

3. A power take-off for a railway car having a car body pivotally mounted on a truck carrying wheels comprising a pair of shaft sections connected for relative lengthwise movement, a pair of supporting sleeves in which the shaft sections are journaled respectively, means including a body of rubber for mounting one of the sleeves on the car body, a pivot rod slidably and rotatably mounted on the truck, means including a body of rubber connecting the other sleeve to the pivot rod, a roller carried by the shaft section journaled in said other sleeve to engage a wheel, and a spring urging the pivot rod in a direction to move the roller toward the wheel.

4. A power take-off for a railway car having a car body pivotally mounted on a truck carrying wheels comprising a pair of shaft sections connected for relative lengthwise movement, a pair of supporting sleeves in which the shaft sections are journaled respectively, means including a body of rubber for mounting one of the sleeves on the car body, a pivot rod slidably and rotatably mounted on the truck, means including a body of rubber connecting the other sleeve to the pivot rod, a roller carried by the shaft section journaled in said other sleeve to engage a wheel, a spring urging the pivot rod in a direction to move the roller toward the wheel, and a cam collar around the pivot rod to move it in a direction to disengage the roller from the wheel.

ARTHUR F. O'CONNOR.

REFERENCES CITED

The following references are of record in the file of this patent:

UNITED STATES PATENTS

| Number | Name | Date |
|---|---|---|
| 814,293 | Johnson | Mar. 6, 1906 |
| 2,413,158 | Van Dorn | Dec. 24, 1946 |

FOREIGN PATENTS

| Number | Country | Date |
|---|---|---|
| 563,268 | France | Sept. 22, 1923 |